(12) United States Patent
Abts

(10) Patent No.: US 10,791,706 B2
(45) Date of Patent: Oct. 6, 2020

(54) DOUBLE TANK MILK SUPPLY SYSTEM FOR PROVIDING A CONTINUOUS SUPPLY OF MILK OR MILK PRODUCTS

(71) Applicant: Gregory John Abts, New Franken, WI (US)

(72) Inventor: Gregory John Abts, New Franken, WI (US)

( * ) Notice: Subject to any disclaimer, the term of this patent is extended or adjusted under 35 U.S.C. 154(b) by 145 days.

(21) Appl. No.: 16/150,266

(22) Filed: Oct. 2, 2018

(65) Prior Publication Data

US 2019/0098865 A1 Apr. 4, 2019

Related U.S. Application Data

(60) Provisional application No. 62/567,214, filed on Oct. 2, 2017.

(51) Int. Cl.
*A01K 5/02* (2006.01)
*A01K 9/00* (2006.01)
(Continued)

(52) U.S. Cl.
CPC ............ *A01K 5/0216* (2013.01); *A01K 7/027* (2013.01); *A01K 7/06* (2013.01); *A01K 9/00* (2013.01)

(58) Field of Classification Search
CPC ........ A01K 5/0216; A01K 7/027; A01K 7/06; A01K 9/00
See application file for complete search history.

(56) References Cited

U.S. PATENT DOCUMENTS 2,263,069 A 11/1941 Coyner
2,672,323 A 3/1954 Larson
(Continued)

FOREIGN PATENT DOCUMENTS

CN 203226118 U 4/2014
CN 203538053 U 4/2014
(Continued)

OTHER PUBLICATIONS

Website: https://businesswales.gov.wales/farmingconnect/posts/calculated-approach-calf-rearing Downloaded Jul. 31, 2017 Article: A Calculated Approach to Calf Rearing.
(Continued)

*Primary Examiner* — Monica L Barlow
(74) *Attorney, Agent, or Firm* — Russ Weinzimmer & Associates, P.C.

(57) ABSTRACT

A double tank milk supply system for providing a continuous supply of cool clean milk or milk products. While one tank provides milk products, the other tank is cleaned. The two tanks are individually cooled, and the washing and cooling cycles are automatically controlled via a data input and display device. Included is an automatic valve system configured to dispense milk product from the second tank when the first tank is empty, and to dispense milk product from the first tank when the second tank is empty. An automatic washing system automatically washes the first tank when the first tank is empty, and washes the second tank when the second tank is empty. Also included is an agitation system, which alternatingly agitates the milk product in the first or second tank. The double tank milk supply system provides uninterrupted cool, clean milk products 24/7/365, saving the farmer time and labor.

17 Claims, 9 Drawing Sheets

(51) Int. Cl.
*A01K 7/06* (2006.01)
*A01K 7/02* (2006.01)

(56) References Cited

U.S. PATENT DOCUMENTS

| | | | |
|---|---|---|---|
| 3,018,915 A | | 1/1962 | Larson |
| 3,037,461 A | | 6/1962 | Kloss |
| 3,090,355 A | | 5/1963 | Gains |
| 3,204,607 A | | 9/1965 | Arnold et al. |
| 3,307,521 A | | 3/1967 | Tavera et al. |
| 3,385,265 A | | 5/1968 | Schrader |
| 3,695,485 A | * | 10/1972 | Littlejohn .................. B41F 7/24 222/68 |
| 4,803,955 A | | 2/1989 | Gonsalves |
| 5,551,374 A | | 9/1996 | Wells |
| 5,878,767 A | * | 3/1999 | Etling .................. B67D 7/0476 137/15.01 |
| 6,199,512 B1 | | 3/2001 | Jefferson et al. |
| 6,212,899 B1 | | 4/2001 | Ward |
| 6,276,264 B1 | | 8/2001 | Dumm |
| 6,360,691 B1 | | 3/2002 | Laue et al. |
| 6,619,227 B1 | | 9/2003 | Berger et al. |
| 7,231,866 B2 | | 6/2007 | Van Den Berg et al. |
| 7,442,014 B1 | * | 10/2008 | Mellinger .................. F04D 1/06 417/18 |
| 7,757,634 B2 | | 7/2010 | Croft |
| 8,075,282 B2 | * | 12/2011 | Huegerich ............ A01M 7/005 137/202 |
| 8,127,667 B2 | | 3/2012 | Kastenschmidt et al. |
| 8,499,717 B2 | | 8/2013 | Birk et al. |
| 9,173,415 B2 | | 11/2015 | Meillan |

FOREIGN PATENT DOCUMENTS

| | | |
|---|---|---|
| DE | 2623499 A1 | 12/1977 |
| DE | 19901587 A1 | 7/2000 |
| DE | 19845168 C2 | 2/2001 |
| DE | 102006044721 A1 | 9/2006 |
| EP | 1882410 A1 | 1/2008 |
| EP | 1897438 A2 | 3/2008 |
| WO | 2015142165 A1 | 9/2015 |

OTHER PUBLICATIONS

Website: htts://www.gea.com/en/products/mobile-milk-troley-milkbuggy.jsp Downloaded Aug. 1, 2017 Mobile Milk Troley MilkBuggy The MilkBugy+ from GEA helps you feed your young cattle regardless of where they are and whether you use milk or milk powder.
YouTube: https://www.youtube.com/watch?v=w9DUnsX5fN4 Downloaded Jul. 30, 2017, Published Nov. 10, 2015 200L Double Mixing Tanks unit for Milk Pasteurizer and HOmogenizer.

* cited by examiner

DOUBLE TANK MILK SUPPLY SYSTEM FOR PROVIDING A CONTINUOUS SUPPLY OF MILK OR MILK PRODUCTS

CROSS-REFERENCE TO RELATED APPLICATIONS

This application claims priority from Provisional Patent Application Ser. No. 62/567,214, filed Oct. 2, 2017, the entire contents of which is herein incorporated by reference.

FIELD OF THE INVENTION

This invention relates generally to dairy equipment, and more particularly to dairy equipment for feeding young animals.

BACKGROUND OF THE INVENTION

Feeding young animals is a common part of raising farm livestock. For example, typically, farm cows are well-nourished and produce more milk than their calves require. Therefore, in modern dairy herd management, it can be advantageous to feed young calves from milk that is not only from their own mother, but from a common supply of milk from a herd of cows. Such milk is typically delivered to calves by milk dispensing equipment known as "calf feeders". Calf feeders usually include a container for holding milk and a synthetic rubber teat that the calves suck on to obtain nourishment from the herd milk.

Because modern dairy farmers often use calf feeders, there is a common and widespread need to store and cool milk for use with calf feeders. However, historically, it has been difficult for farmers to find milk storage solutions that keep the feeder milk both clean and cool, and that also work well "in-place" with calf feeders.

Therefore, dairy farmers have had to improvise, resulting in less than ideal solutions, such as purchasing foreign-made milk containers that must be manually washed, or farmers have had to use open-top milk storage tanks with inadequate protection against contamination from dirt and debris. In addition, traditional milk tanks for calf feeders were manually refilled, which requires significant additional labor from the dairy farmer. If for some reason the farmer is unable to manually refill the milk tanks, the calves may be without milk for hours.

Another problem typically encountered by dairy farmers was the "end of day" problem. If the calf feeder was almost empty at the end of the day, the farmer had to decide to either: 1) dump the balance of the milk, and wash and refill the feeder tank, or 2) wait until the tank was empty, and then wash and refill the feeder tank. However, option 1 wastes milk, and option 2 may cause the calves to be without milk for hours.

SUMMARY OF THE INVENTION

The double tank milk supply system of the invention provides a solution to the problem of providing a continuous supply of clean cool milk for calf feeders.

The double tank milk supply system of the invention provides two tanks, with one tank providing milk while the other tank is being cleaned, thereby providing a continuous supply of milk for young animals. In addition, the two tanks are individually cooled on demand, with the washing and cooling cycles being automatically controlled so the system can be run largely unattended, saving the farmer's time and labor.

The double tank milk supply system of the invention is a low maintenance solution, designed to provide an uninterrupted cool, clean supply of feeder milk, 24/7, 365 days a year.

A general aspect of the invention is a double tank milk supply system for providing a continuous supply of milk or a milk product. The double tank milk supply system includes: a pair of tanks, the pair of tanks having a first tank and a second tank, each tank configured to hold a sequence of fluids including: a milk product, a hot cleaning solution, and a cold water wash; a valve system, configured to independently control each of: the sequence of fluids exiting the first tank, and the sequence of fluids exiting the second tank; an automatic empty system, which automatically configures the valve system to dispense the milk product from the second tank when the first tank is empty, and to dispense the milk product from the first tank when the second tank is empty, thereby providing continuous dispensing of the milk product; a cooling system, which independently and alternately cools the first tank and then the second tank; an automatic washing system, which automatically washes the first tank when the first tank is empty, and which automatically washes the second tank when the second tank is empty; an agitation system, which independently agitates the milk product in the first tank, and independently agitates the milk product in the second tank; a wash pump to pump out the hot cleaning solution from a set of outgoing washing pipes; a tank insulation layer, configured to provide thermal insulation for the first tank and for the second tank; a data input and display device configured to accept a user's input data, and to display operational information; and a cabinet, which encloses at least the pair of tanks.

In some embodiments, the pair of tanks are independently and alternately chilled to 40 degrees F. whenever the milk product is in each of the tanks.

In some embodiments, the automatic washing system has a chemical pump, a wash pump, and a wash drain.

In some embodiments, the valve system has valves that control the fluids exiting the pair of tanks, including: a first milk valve connected to a first exit pipe of the first tank; a first wash valve connected to the first exit pipe of the first tank; a second milk valve connected to a second exit pipe of the second tank; a second wash valve connected to the second exit pipe of the second tank; the first milk valve, the first wash valve, the second milk valve, and the second wash valve being configured such that: when the first milk valve is open to allow a flow of milk product, the first wash valve is closed to isolate the set of outgoing washing pipes, and when the second milk valve is open to allow a flow of milk product, the second wash valve is closed to isolate the set of outgoing washing pipes.

In some embodiments, the automatic washing system has a wash valve manifold to control a transfer of a sequence of cleaning fluids, that includes: a first wash fill solenoid valve connected to the first tank; a first wash pump solenoid valve connected to the first tank; a second wash fill solenoid valve connected to the second tank; a second wash pump solenoid valve connected to the second tank; a central block, connecting the first wash fill solenoid valve and the first wash pump solenoid valve to the first tank, and connecting the second wash fill solenoid valve and the second wash pump solenoid valve to the second tank, configured such that when the first wash fill solenoid valve is open to inject the sequence of cleaning fluids, the second wash fill solenoid valve is closed to isolate the milk product in the second tank, and when the first wash pump solenoid valve is open to pump out the sequence of cleaning fluids, the second wash pump solenoid valve is closed to isolate the milk product in the second tank.

In some embodiments, the pair of tanks is made of stainless steel, or fiberglass, or plastic, or aluminum.

In some embodiments, the cabinet is made of stainless steel, or fiberglass, or plastic, or aluminum.

In some embodiments, the data display and input device is a touch screen display, which responds to a touch of a user, and displays operational information about the double tank milk feeder system.

In some embodiments, the valve system includes pneumatic valves.

Another general aspect of the invention is a double tank milk supply system, for providing a continuous supply of milk or a milk product. This double tank milk supply system includes: a pair of tanks, the pair of tanks having a first tank and a second tank, each tank configured to hold a sequence of fluids including: a milk product, a hot cleaning solution, a cold water wash, and pressurized air; a valve system, configured to independently control each of: the sequence of fluids exiting the first tank, and the sequence of fluids exiting the second tank, the valves that control the fluids exiting the pair of tanks including: a first milk valve connected to a first exit pipe of the first tank; a first wash valve connected to the first exit pipe of the first tank; a second milk valve connected to a second exit pipe of the second tank; and a second wash valve connected to the second exit pipe of the second tank, the first milk valve, the first wash valve, the second milk valve, and the second wash valve being configured such that: when the first milk valve is open to allow a flow of milk product, the first wash valve is closed to isolate the set of outgoing washing pipes, and when the second milk valve is open to allow a flow of milk product, the second wash valve is closed to isolate the set of outgoing washing pipes; an automatic empty system, which automatically configures the valve system to dispense the milk product from the second tank when the first tank is empty, and to dispense the milk product from the first tank when the second tank is empty, thereby providing continuous dispensing of the milk product; a cooling system, which independently and alternately cools the first tank and then the second tank; an automatic washing system, which automatically washes the first tank when the first tank is empty, and which automatically washes the second tank when the second tank is empty; an agitation system, which independently agitates the milk product in the first tank, and independently agitates the milk product in the second tank; a wash pump to pump out the hot cleaning solution from a set of outgoing washing pipes; a tank insulation layer, which provides thermal insulation for the first tank and for the second tank; a data input and display device configured to accept a user's input data, and to display operational information; and a cabinet, which encloses at least the pair of tanks.

In some embodiments, the pair of tanks are independently and alternately chilled to 40 degrees F. whenever the milk product is in each of the tanks.

In some embodiments, the automatic washing system has a chemical pump, a wash pump, and a wash drain.

In some embodiments, the automatic washing system has a wash valve manifold to control a transfer of a sequence of cleaning fluids, that includes: a first wash fill solenoid valve connected to the first tank; a first wash pump solenoid valve connected to the first tank; a second wash fill solenoid valve connected to the second tank; a second wash pump solenoid valve connected to the second tank; a central block, connecting the first wash fill solenoid valve and the first wash pump solenoid valve to the first tank, and connecting the second wash fill solenoid valve and the second wash pump solenoid valve to the second tank, configured such that when the first wash fill solenoid valve is open to inject the sequence of cleaning fluids, the second wash fill solenoid valve is closed to isolate the milk product in the second tank, and when the first wash pump solenoid valve is open to pump out the sequence of cleaning fluids, the second wash pump solenoid valve is closed to isolate the milk product in the second tank.

In some embodiments, the pair of tanks is made of stainless steel, or fiberglass, or plastic, or aluminum.

In some embodiments, the cabinet is made of stainless steel, or fiberglass, or plastic, or aluminum.

In some embodiments, the data display and input device is a touch screen display, which responds to a touch of a user, and displays operational information about the double tank milk feeder system.

In some embodiments, the valve system includes pneumatic valves.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
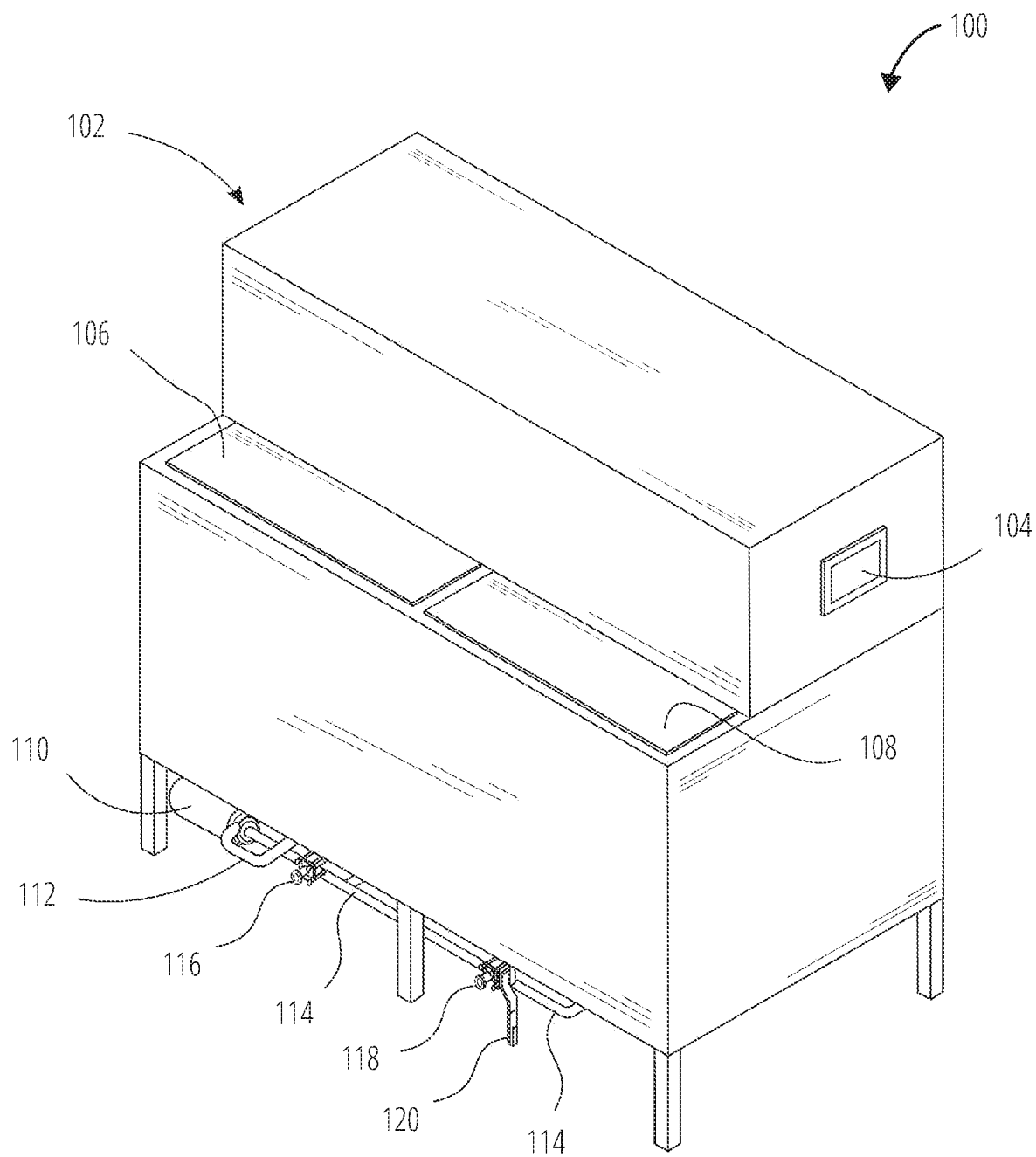
FIG. 1 is an isometric view showing an embodiment of the double tank milk supply system, showing the data input and display device, and the first tank cover and the second tank cover, which protect and provide access to the first milk tank and the second milk tank.

With reference to FIG. 1, an isometric view is shown of an embodiment of a double tank milk supply system 100. The double tank milk supply system 100 includes a cabinet 102, which encloses at least a first tank 202 and a second tank 204 (both shown in FIG. 2). Also shown is a data input and display device 104 configured to accept a user's input data, and to display operational information.

The cabinet 102 also includes a first tank cover 106 to protect and provide access to the milk contained in first tank 202, and a second tank cover 108 to protect and provide access to the milk contained in the second tank 204.

A set of outgoing washing pipes 114 connect the first tank 202 and the second tank 204 to a wash pump 110. The wash pump 110 is configured to alternately and sequentially pump out a hot cleaning solution used to clean the first tank 202 and the second tank 204. The wash pump 110 pumps out the hot cleaning solution into a drain pipe 112 for disposal of the hot cleaning solution as waste effluent.

Also shown are a first exit pipe 116 configured to dispense milk product alternately and sequentially from the first tank 202 and from the second tank 204.

Figure 2:
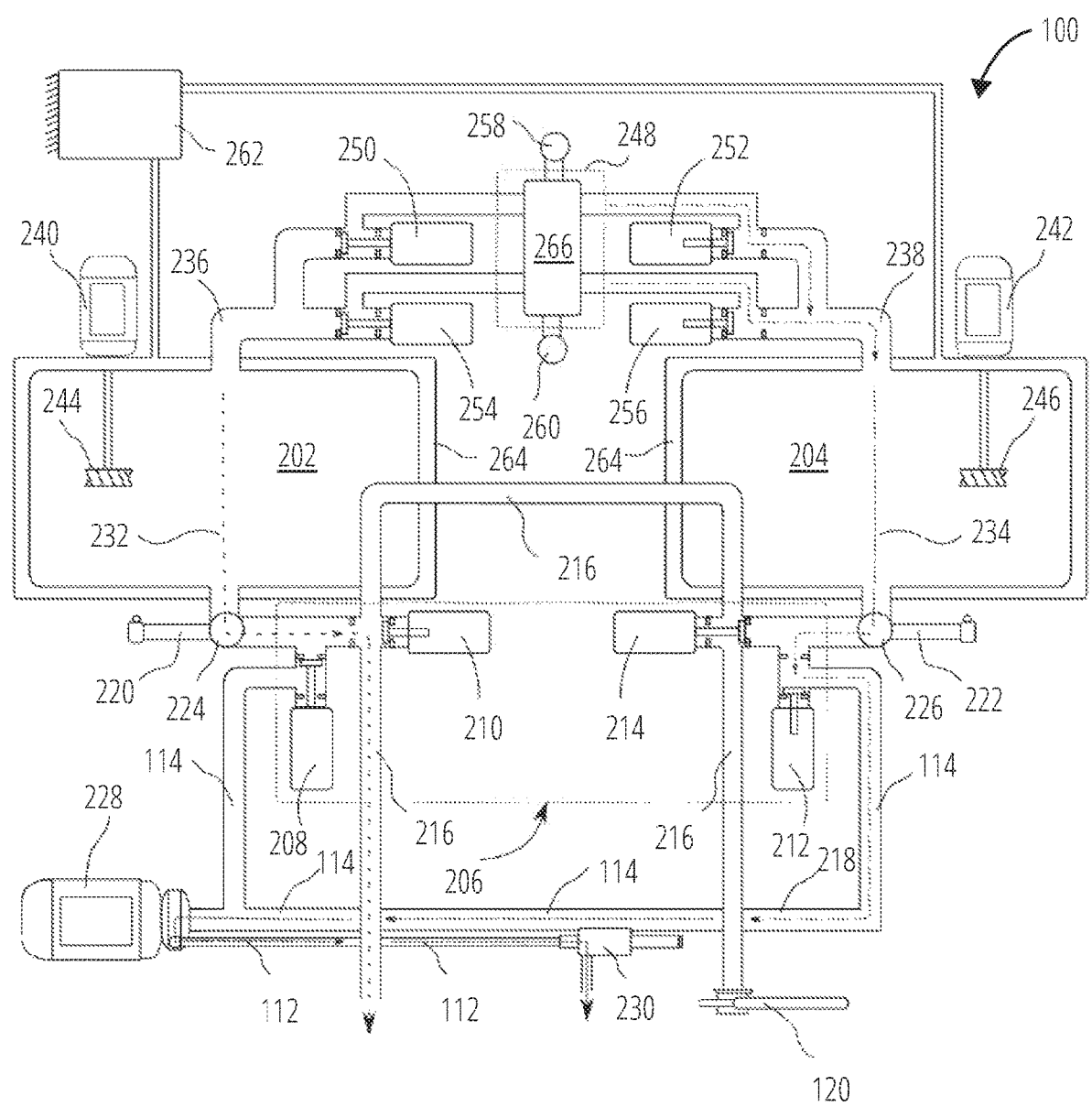
FIG. 2 is a schematic view of the embodiment of FIG. 1, showing the milk product being dispensed from the first tank while the second tank is being washed.

In this embodiment, a second exit pipe 118 includes a manually operated wash hook hand valve 120 for cleaning the U-shaped milk pipe 216 (shown in FIG. 2).

In some embodiments, the cabinet 102 is made of stainless steel, or fiberglass, or plastic, or aluminum.

In some embodiments, the data input and display device 104 is a touch screen display, which responds to a touch of a user, and displays operational information about the double tank milk supply system 100.

With reference to FIG. 2, a schematic view is shown of an embodiment of the double tank milk supply system 100 showing a first phase of operation wherein a first tank 202 is dispensing milk product, and a second tank 204 is being washed.

Figure 3:
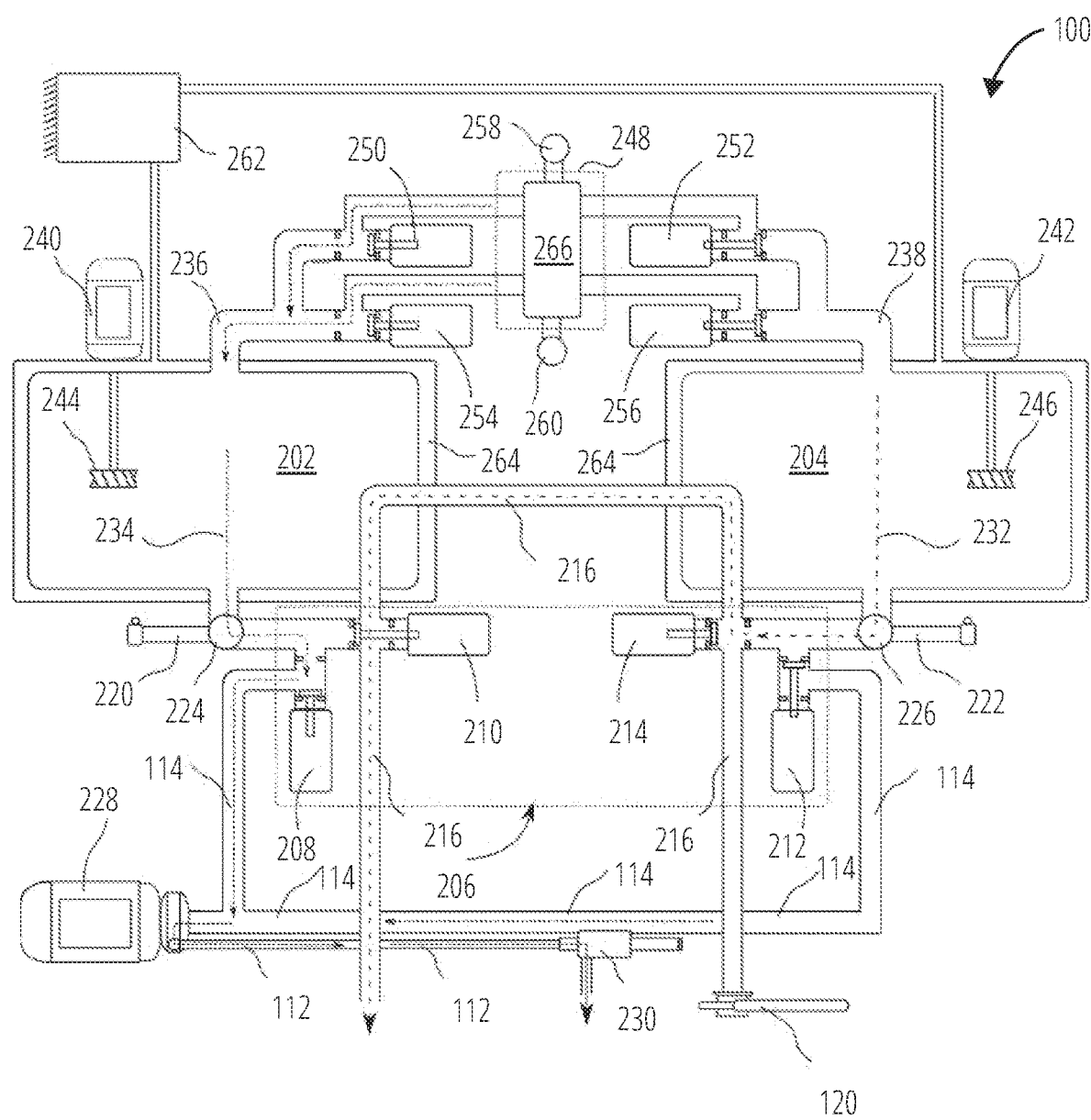
FIG. 3 is a schematic view of the embodiment of FIG. 1, showing the milk product being dispensed from the second tank while the first tank is being washed.

In this embodiment, the double tank milk supply system 100 provides a continuous supply of milk by alternately and sequentially drawing milk from the first tank 202 (shown in FIG. 2) and then from the second tank 204 (shown in FIG. 3). The sequence then repeats, drawing milk again from the first tank 202, and then again from the second tank 204.

In some embodiments, the first tank 202 and the second tank 204 are made of stainless steel, or fiberglass, or plastic, or aluminum.

A valve system 206 (shown enclosed by a dotted rectangle) independently directs the sequence of fluids exiting the first tank 202, and the sequence of fluids exiting the second tank 204. The valve system 206 includes: a first wash valve 208, a first milk valve 210, a second wash valve 212, and a second milk valve 214.

In some embodiments, the valve system 206 includes pneumatically controlled valves.

Figure 4:
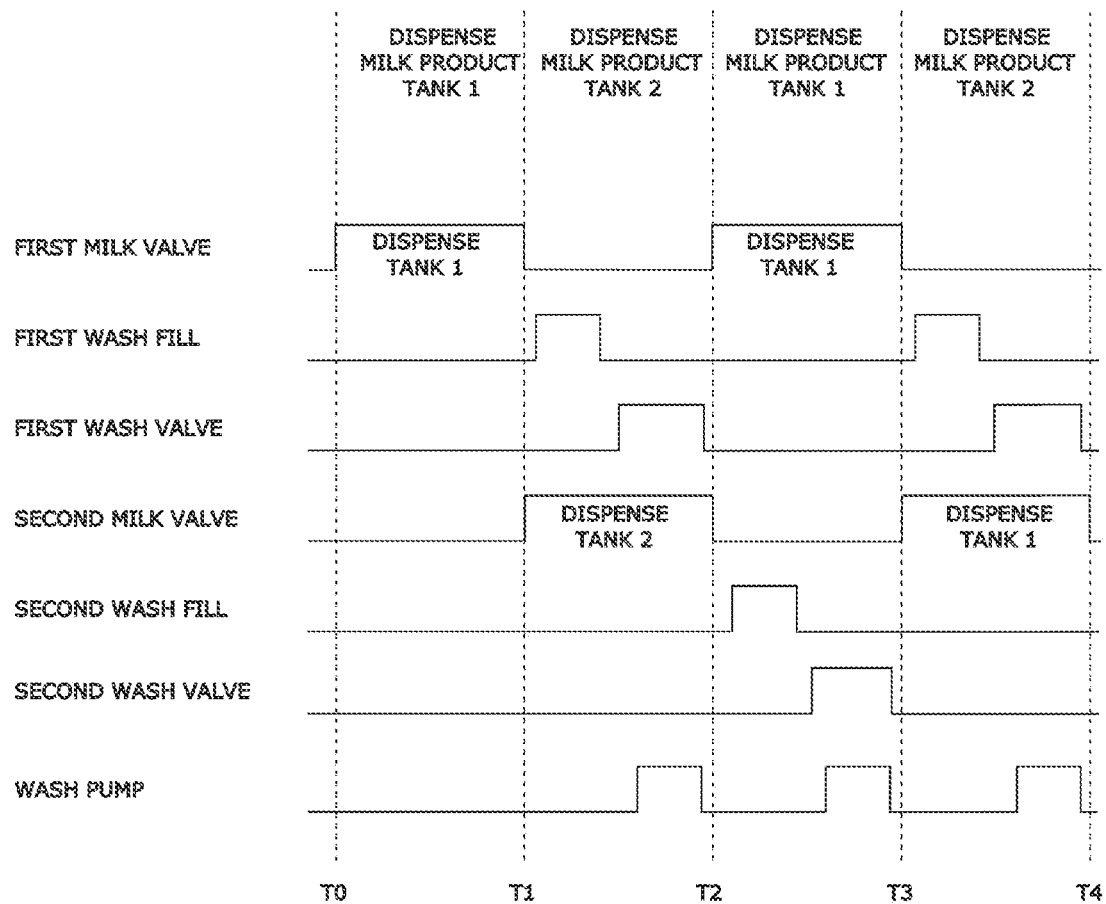
FIG. 4 is a timing chart illustrating phases of operation of the double tank milk supply system of FIGS. 2 and 3.

In some embodiments, the double tank milk supply system 100 includes an automatic empty system operating in accordance with the timing diagram of FIG. 4, which automatically operates the valve system 206 to dispense the milk product from the second tank 204 when the first tank 202 is empty, and to dispense the milk product from the first tank 202 when the second tank 204 is empty.

In this embodiment, there is a cooling system 262 which independently and alternately cools the first tank 202 and then the second tank 204. In some embodiments, the first tank 202 and the second tank 204 are independently and alternately chilled to 40 degrees F. (for example) whenever the milk product is in each of the tanks.

A tank insulation layer 264 provides thermal insulation for the first tank 202 and the second tank 204.

A first level sensor 220 senses the milk product level in the first tank 202, and a second level sensor 222 senses the milk product level in the second tank 204.

In this embodiment the double tank milk supply system 100 includes an automatic washing system, which automatically washes the first tank 202 when the first tank 202 becomes empty of milk product, and which automatically washes the second tank 204 when the second tank 204 becomes empty of milk product.

The automatic washing system includes a wash valve manifold 248. The wash valve manifold 248 directs hot water, cold water, and a wash chemical into an ingoing wash fill pipe 258 and then into a central block 266. The wash valve manifold 248 also connects an ingoing wash pump pipe 260 to the central block 266. In addition, the wash valve manifold 248 connects a first wash fill solenoid valve 250 and a first wash pump solenoid valve 254 to an ingoing first tank pipe 236 which is connected to the first tank 202. The wash valve manifold 248 also connects a second wash fill solenoid valve 252 and a second wash pump solenoid valve 256 to an ingoing second milk tank pipe 238 which is connected to the second tank 204.

This embodiment includes an agitation system, which includes a first tank agitation motor 240 and a first tank stirrer 244 to independently agitate the milk product in the first tank 202. The agitation system also includes a second tank agitation motor 242 and a second tank stirrer 246 to independently agitate the milk product in the second tank 204. In some embodiments, the agitation system may utilize pulsed agitation to minimized damage from over-agitation of the milk product contained in the first tank 202 and in the second tank 204.

A milk product flow 232 is shown as a dashed line passing through the first tank 202 and into the outgoing first tank pipe 224. The milk product flow 232 originates in first tank 202 and flows downward through the outgoing first tank pipe 224. The milk product flow 232 then continues downward into the U-shaped milk pipe 216, until it exits so as to be dispensed through the first exit pipe 116 (shown in FIG. 1).

While the first tank 202 is dispensing milk product, the second tank 204 may be cleaned.

FIG. 2 also shows both the second wash fill solenoid valve 252 and the second wash pump solenoid valve 256 open, as a wash fluid flow 234 (shown as a dotted line) enters the second tank 204. The wash fluid flow 234 consists of a hot cleaning solution, which may contain a cleaning chemical from a chemical pump 502 (shown in FIG. 5). During the wash cycle for second tank 204, the wash fluid flow 234 exits the second tank 204 through the outgoing second tank pipe 226.

While milk product is being dispensed from the first tank 202 and while the second tank 204 is being washed, the first milk valve 210 is open, and the first wash valve 208 is closed to isolate the set of outgoing washing pipes 114 from the milk product. While the second tank 204 is being washed, the second milk valve 214 is closed to isolate the set of outgoing washing pipes 114, while the second wash valve 212 is open to transfer the wash fluid flow 234 out to the set of outgoing washing pipes 114.

FIG. 2 also shows a wash pump 228 pumping out the hot cleaning solution from the second tank 204 through the set of outgoing washing pipes 114. The wash fluid flow 234 is disposed of through a drain pipe 112. In this embodiment the drain pipe 112 also includes a drain valve 230.

In this embodiment, the second exit pipe 118 (shown in FIG. 1) includes a manually operated wash hook hand valve 120, used when cleaning the U-shaped milk pipe 216.

With reference to FIG. 3, a schematic view is shown of an embodiment of the double tank milk supply system 100 with the second tank 204 dispensing milk product and the first tank 202 being washed.

In this embodiment, the double tank milk supply system 100 provides a continuous supply of milk product by alternately and sequentially drawing milk product from the first tank 202 and then from the second tank 204. The sequence then continues by drawing milk product from the second tank 204 and then from the first tank 202.

A valve system 206 (shown as a dotted rectangle) independently directs the sequence of fluids exiting the first tank 202, and the sequence of fluids exiting the second tank 204.

In this embodiment the double tank milk supply system 100 includes an automatic washing system, which automatically washes the first tank 202 when the first tank 202 is empty, and which automatically washes the second tank 204 when the second tank 204 is empty.

The milk product flow 232 is shown as a dashed line passing through the second tank 204 and into the outgoing second tank pipe 226. The milk product flow 232 originates in second tank 204 and flows downward through the outgoing second tank pipe 226. The milk product flow 232 then continues downward into the U-shaped milk pipe 216, exiting so as to be dispensed through the first exit pipe 116 (shown in FIG. 1).

While the second tank 204 is dispensing milk product, the first tank 202 is cleaned.

FIG. 3 also shows both the first wash fill solenoid valve 250 and the first wash pump solenoid valve 254 open, as a wash fluid flow 234 (shown as a dotted line) enters the first tank 202. The wash fluid flow 234 consists of a hot cleaning solution, which may contain a cleaning chemical from a chemical pump 502 (shown in FIG. 5). During the wash cycle for first tank 202, the wash fluid flow 234 exits the first tank 202 through the outgoing first tank pipe 224.

While milk product is being dispensed from the second tank 204 and simultaneously the first tank 202 is being washed, the second milk valve 214 is open and the second wash valve 212 is closed to isolate the set of outgoing washing pipes 114 from the milk product. While the first tank 202 is being washed, the first milk valve 210 is closed to isolate the set of outgoing washing pipes 114, while the first wash valve 208 is open to transfer the wash fluid flow 234 out to the set of outgoing washing pipes 114.

FIG. 3 also shows a wash pump 228 pumping out the hot cleaning solution from the first tank 202 through the set of outgoing washing pipes 114. The wash fluid flow 234 is disposed of through a drain pipe 112. In this embodiment the drain pipe 112 also includes a drain valve 230.

In this embodiment, the second exit pipe 118 (shown in FIG. 1) includes a manually operated wash hook hand valve 120, used when cleaning the U-shaped milk pipe 216.

With reference to FIG. 4, a timing diagram is shown of an embodiment of the double tank milk supply system 100.

For the following, unless otherwise noted, FIG. 2 shows the items and the reference numbers described below.

At initial time T0, the first tank 202 and the second tank 204 are both filled with milk product. At time T0, the following valves are closed: the first wash valve 208, the second wash valve 212, the first wash fill solenoid valve 250, the second wash fill solenoid valve 252, the first wash pump solenoid valve 254, and the second wash pump solenoid valve 256. Immediately after time T0, the first milk valve 210 opens and the first tank 202 begins dispensing milk product as the milk product flow 232 flows downward through the outgoing first tank pipe 224 and into the U-shaped milk pipe 216, and the milk product is dispensed through the first exit pipe 116 (shown in FIG. 1).

At time T1, the first tank 202 has been emptied of milk product, and the first milk valve 210 is closed, which isolates the first tank 202 from the U-shaped milk pipe 216.

To provide a continuous supply of milk product to the first exit pipe 116, at time T1 the second wash valve 212 is closed, and the second milk valve 214 opens and the second tank 204 begins dispensing milk product and milk product flow 232 flows downward through the outgoing second tank pipe 226 and into the U-shaped milk pipe 216, and, as before, the milk product is dispensed through the first exit pipe 116 (shown in FIG. 1).

At time T1, while the milk product is being dispensed from the second tank 204, the cleaning of the first tank 202 begins.

The first wash fill solenoid valve 250 and the first wash pump solenoid valve 254 open to allow a hot cleaning solution to enter the first tank 202 to begin the cleaning of the first tank 202. In some embodiments, a chemical pump 502 (shown in FIG. 5) pumps cleaning chemical into the first tank 202 at this time. The wash valve manifold 248 directs the wash fluid flow 234 from the ingoing wash fill pipe 258, the ingoing wash pump pipe 260, and the chemical pump 502 (shown in FIG. 5) into the ingoing first tank pipe 236 and into the first tank 202. After the hot cleaning solution washes the first tank 202, a cold water wash washes the first tank 202.

At a time between time T1 and time T2, the wash fluid flow 234 through the first tank 202 is stopped, once the first tank 202 has been cleaned, by closing the first wash fill solenoid valve 250 and the first wash pump solenoid valve 254.

At a time between time T1 and time T2, the wash pump 110 (shown in FIG. 1) pumps out the cleaning fluid from the first tank 202. The wash pump 110 cycle is shown on the bottom waveform of the timing diagram of FIG. 4.

After the wash fluid has been removed from the first tank 202, the first wash valve 208 closes, and the first tank 202 is ready to be filled again with milk product.

At time T2, the first tank 202 is now again filled with milk, and the first milk valve 210 opens to dispense the milk product to the first exit pipe 116.

At a time between time T2 and time T3, while the milk product is being dispensed from the first tank 202, the cleaning of the second tank 204 begins.

The second wash fill solenoid valve 252 and the second wash pump solenoid valve 256 open to allow a hot cleaning solution to enter the second tank 204 to begin the cleaning of the second tank 204. In some embodiments, a chemical pump 502 (shown in FIG. 5) pumps cleaning chemical into the second tank 204 at this time. The wash valve manifold 248 directs the wash fluid flow 234 from the ingoing wash fill pipe 258, the ingoing wash pump pipe 260, and the chemical pump 502 (shown in FIG. 5) into the ingoing second milk tank pipe 238 and into the second tank 204. After the hot cleaning solution washes the second tank 204, a cold water wash washes the second tank 204.

At a time between time T2 and time T3, the wash fluid flow 234 is stopped once the second tank 204 has been cleaned by closing the second wash fill solenoid valve 252 and the second wash pump solenoid valve 256.

At a time between time T2 and time T3, the wash pump 110 (shown in FIG. 1) pumps out the cleaning fluid from the second tank 204. The wash pump 110 cycle is shown on the bottom waveform of the timing diagram of FIG. 4.

After the wash fluid has been removed from the second tank 204, the second wash valve 212 closes, and the second tank 204 is ready to be filled with milk product again.

Figure 5:
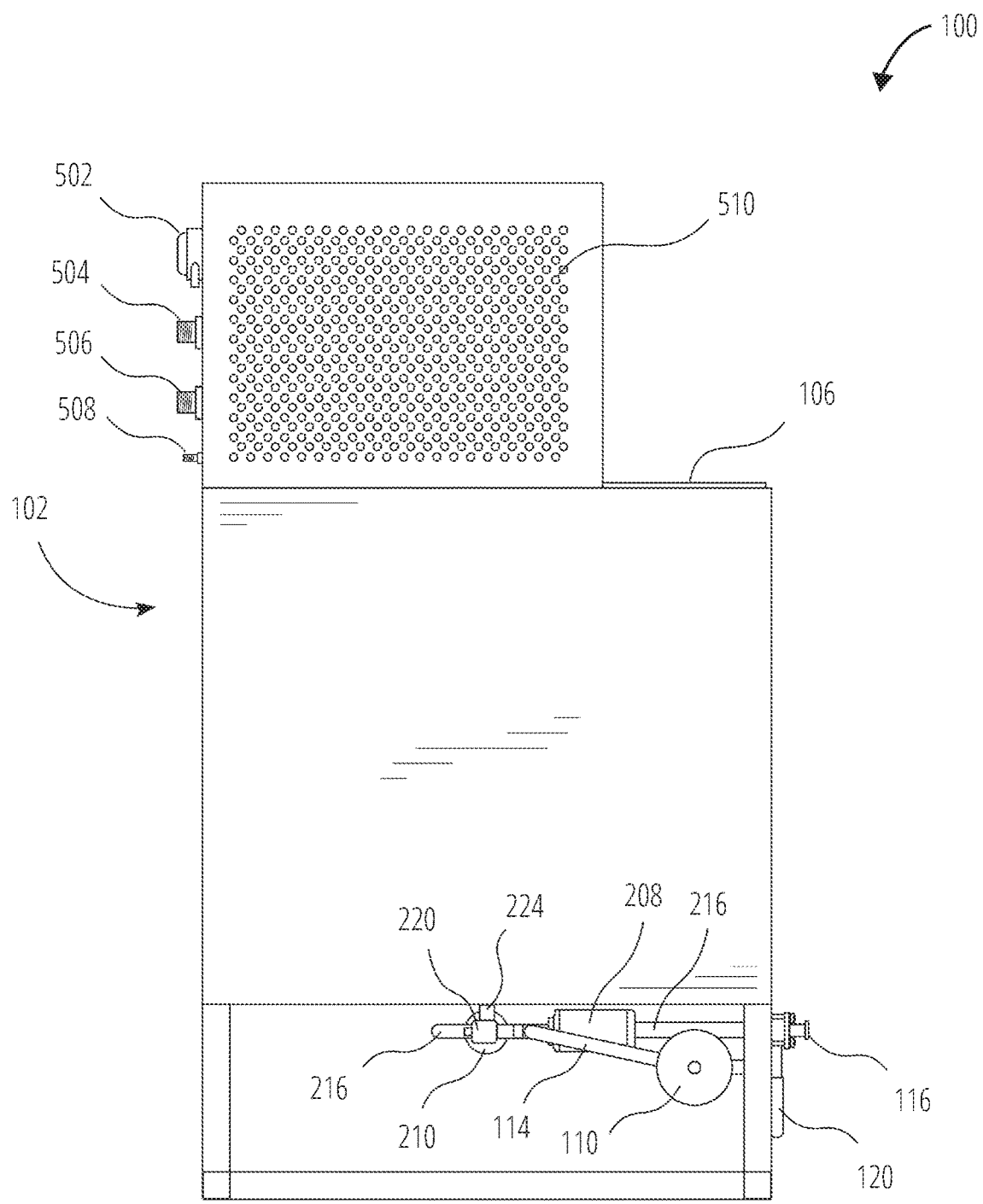
FIG. 5 is a left side view of the embodiment of FIG. 1, showing the cooling system vents, the fluid connectors, the wash pump, a wash valve, a milk valve, a level sensor, and a milk exit pipe.

With reference to FIG. 5, a left side view is shown of the double tank milk supply system 100. The double tank milk supply system 100 includes the cabinet 102. Also shown is the first tank cover 106 which protects and provides access to milk product contained within the first tank 202 (shown in FIG. 2). The left side of the cabinet 102 includes cooling system vents 510 which allow the cooling system 262 (shown in FIG. 2) to access the room air outside of the cabinet 102.

Shown on the back of the cabinet 102 are a chemical pump 502, a hot water connector 504, a cold water connector 506, and a pressurized air connector 508.

In the lower portion of this left side view is shown: the outgoing first tank pipe 224, the first level sensor 220, the U-shaped milk pipe 216, the first wash valve 208, the first milk valve 210, the set of outgoing washing pipes 114, the wash pump 110, the first exit pipe 116, and the manual wash hook hand valve 120.

Figure 6:
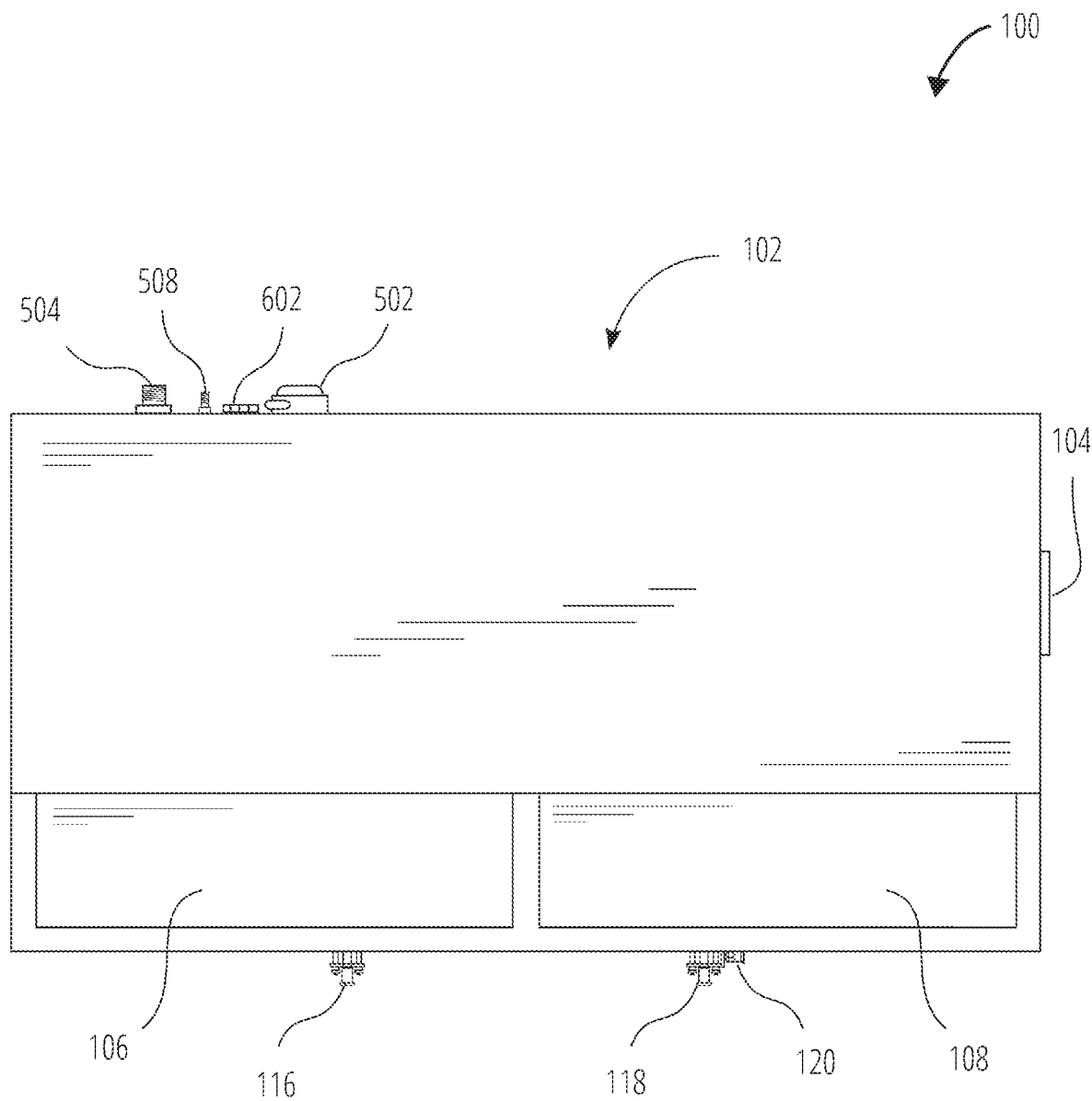
FIG. 6 is a top view of the embodiment of FIG. 1, showing the first tank cover the second tank cover, the first exit pipe, the second exit pipe, the wash hook hand valve, the data input and display device, the fluid connectors, and the electrical power connector.

With reference to FIG. 6, a top view is shown of the double tank milk supply system 100. The double tank milk supply system 100 includes the cabinet 102. Shown on the right side of the cabinet 102 is a top view of the data input and display device 104, configured to accept a user's input data, and to display operational information.

Also shown is the first tank cover 106 which protects and provides access to milk product contained in the first tank 202, and the second tank cover 108 which protects and provides access to milk product contained in the second tank 204 (both tanks are shown in FIG. 2).

Shown on the back of the cabinet 102 are the chemical pump 502, and the hot water connector 504. The cold water connector 506 (shown in FIG. 5) is below and obscured by the hot water connector 504. Also shown on the back of the cabinet 102 is the pressurized air connector 508 and an electrical power connector 602 for connecting to a power cord to provide the main electrical power for the double tank milk supply system 100.

Also shown are the first exit pipe 116, the second exit pipe 118, and the wash hook hand valve 120, all located on the lower portion of the double tank milk supply system 100.

Figure 7:
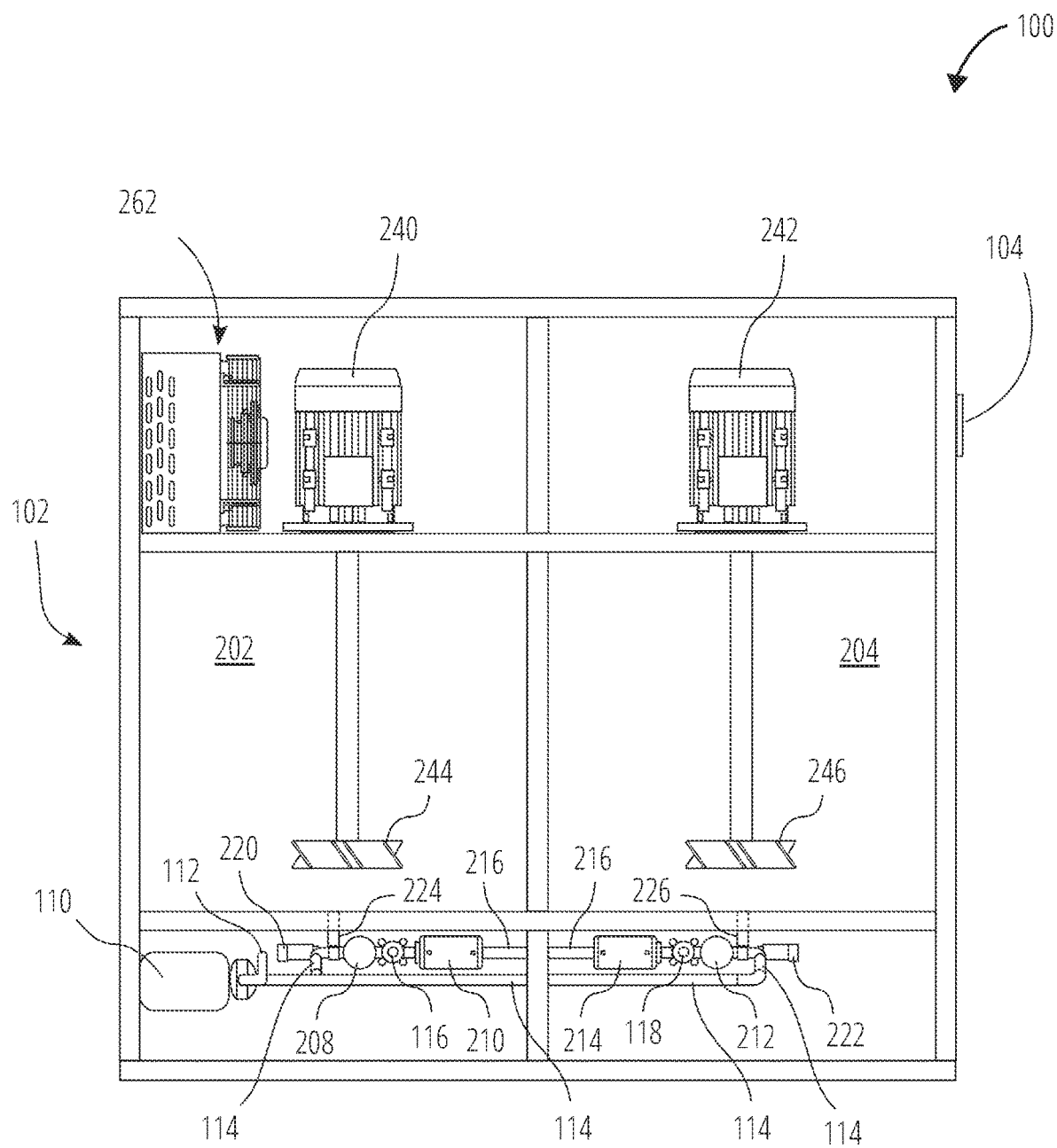
FIG. 7 is a front interior view of the embodiment of FIG. 1, showing the cooling system, first tank agitation motor, the second tank agitation motor, the wash pump, the wash valves, the milk valves, the level sensors, the milk exit pipes, and the data input and display device.

With reference to FIG. 7, a front view is shown of the double tank milk supply system 100. The double tank milk supply system 100 includes the cabinet 102. Also shown is a front view of the data input and display device 104, located in the right side of the cabinet 102, and configured to accept a user's input data, and to display operational information.

In this embodiment, the cooling system 262 independently and alternately cools the first tank 202, and then the second tank 204.

The double tank milk supply system 100 includes the agitation system which includes the first tank agitation motor 240 connected to the first tank stirrer 244, and the second tank agitation motor 242 connected to the second tank stirrer 246 which independently agitates the milk product in the first tank 202, and independently agitates the milk product in the second tank 204.

In some embodiments, the agitation system may utilize pulsed agitation to minimized damage from over-agitation of the milk product contained in the first tank 202 and in the second tank 204.

When the first milk valve 210 is configured to be open, the first wash valve 208 is closed and the milk product from the first tank 202 flows downward through the outgoing first tank pipe 224. The milk product from first tank 202 then continues to flow through the U-shaped milk pipe 216 into the first exit pipe 116. The level of the milk product in first tank 202 is monitored by the first level sensor 220.

When the second milk valve 214 is configured to be open, the second wash valve 212 is closed and the milk product from the second tank 204 flows downward through the outgoing second tank pipe 226. The milk product from second tank 204 then continues to flow through the U-shaped milk pipe 216 into the second exit pipe 118. The level of the milk product in second tank 204 is monitored by the second level sensor 222.

Also shown are the set of outgoing washing pipes 114, the wash pump 110, and the drain pipe 112 configured to dispose of the washing fluids.

Figure 8:
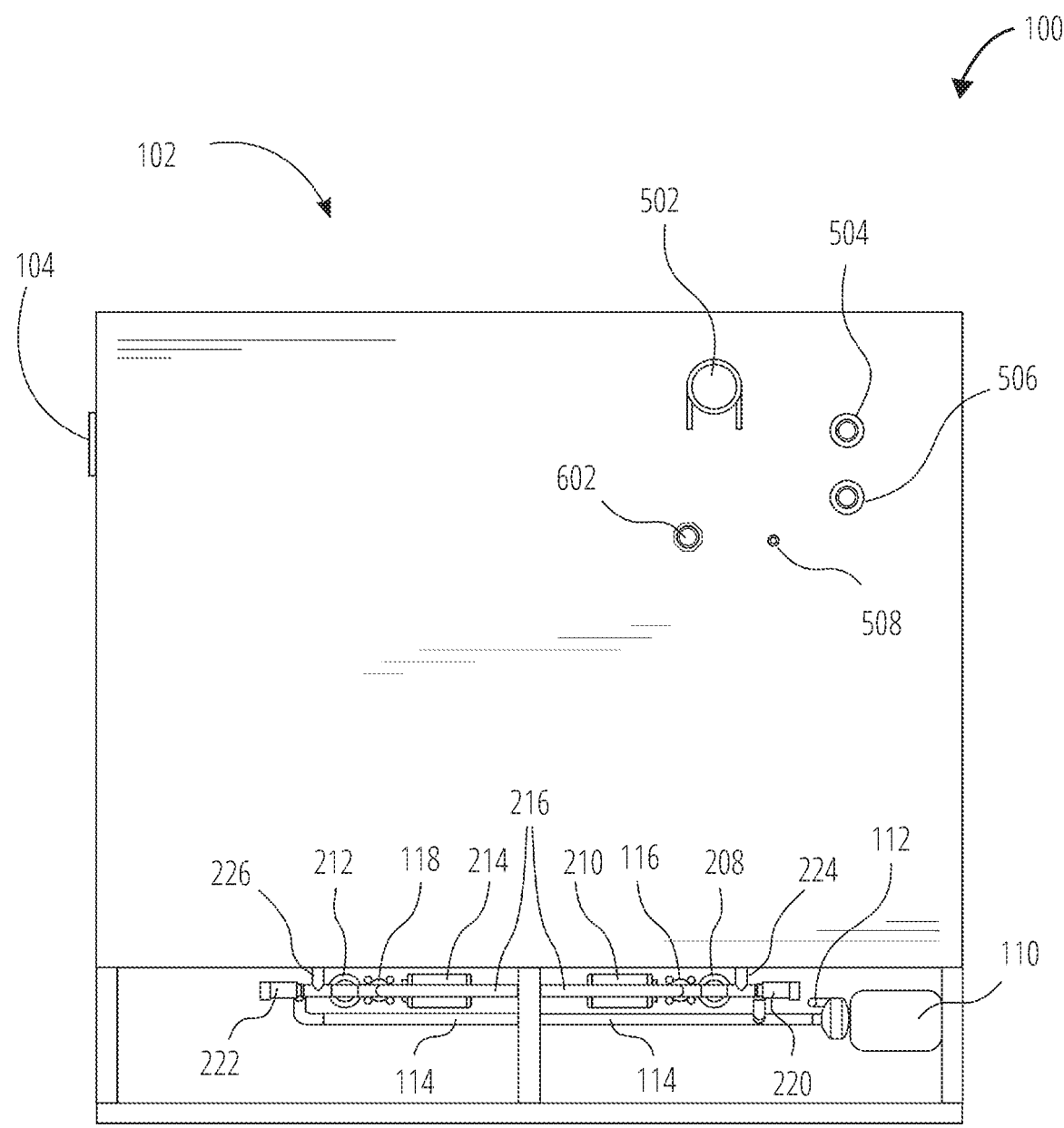
FIG. 8 is a rear view of the embodiment of FIG. 1, showing the fluid connectors, the electrical power connector, the wash pump, the wash valves, the milk valves, the level sensors, the milk exit pipes, and the data input and display device.

With reference to FIG. 8, a rear view is shown of the double tank milk supply system 100. The double tank milk supply system 100 includes the cabinet 102. Also shown is a rear view of the data input and display device 104, configured to accept a user's input data, and to display operational information.

Shown on the back of the cabinet 102 are the chemical pump 502 (shown not connected to chemical intake or outflow hoses), the hot water connector 504, the cold water connector 506, the pressurized air connector 508, and an electrical power connector 602 for connecting to a power cord to provide the main electrical power for the double tank milk supply system 100.

On the bottom of the cabinet 102 are shown the components of the valve system 206 (shown in FIG. 2), including: the first wash valve 208, the first milk valve 210, the second wash valve 212, and the second milk valve 214. Also shown are the first level sensor 220, the second level sensor 222, and the U-shaped milk pipe 216.

The bottom portion of the cabinet 102 also includes: the outgoing first tank pipe 224, the outgoing second tank pipe 226, the set of outgoing washing pipes 114, the first exit pipe 116, the second exit pipe 118, the wash pump 110 which pumps out the hot cleaning solution, and the drain pipe 112 configured to dispose of the washing fluids.

Figure 9:
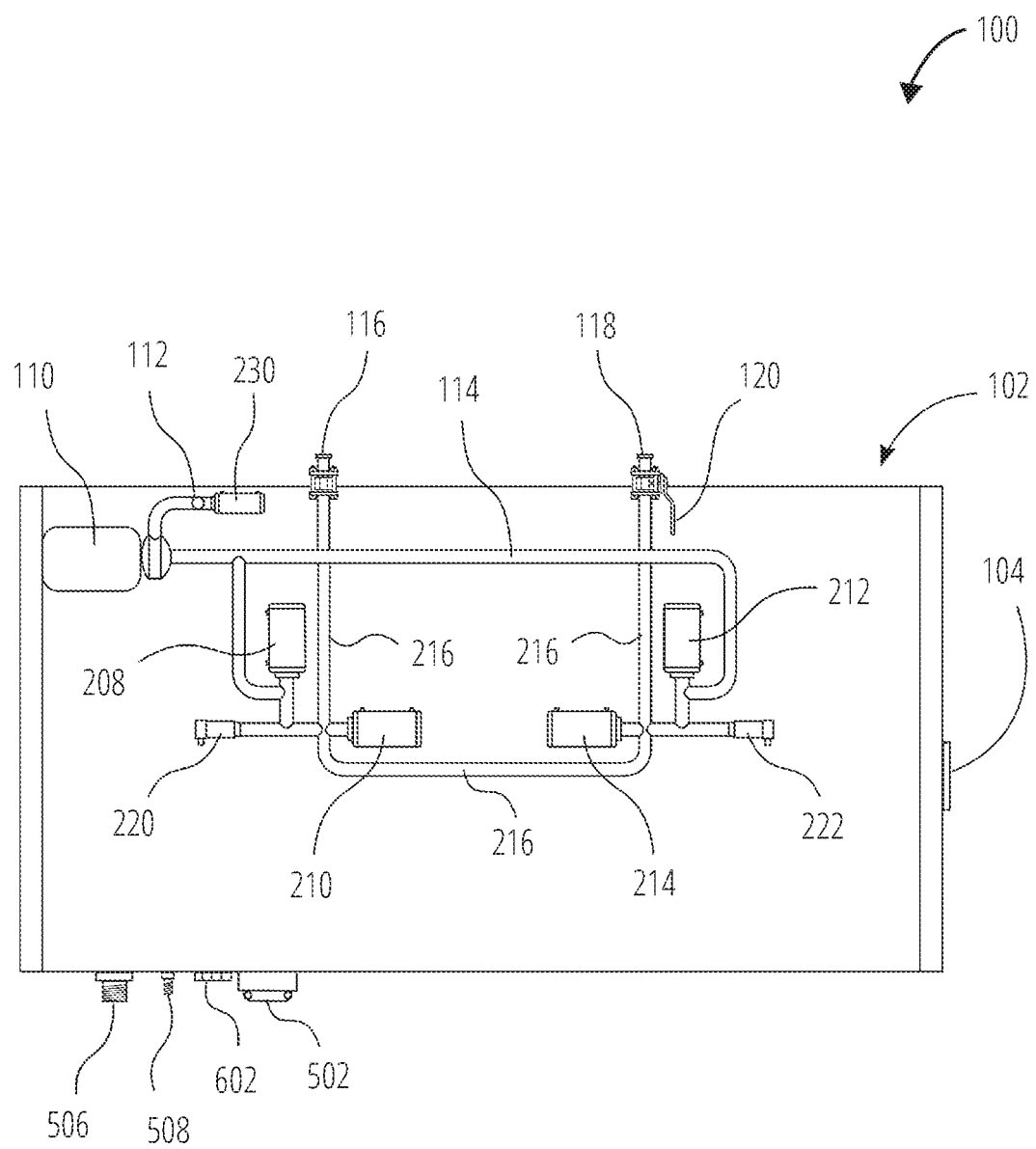
FIG. 9 is a bottom view of the embodiment of FIG. 1, showing the fluid connectors, the electrical power connector, the wash pump, the drain pipe, the drain valve, the wash valves, the milk valves, the level sensors, the milk exit pipes, and the data input and display device.

With reference to FIG. 9, a bottom view is shown of the double tank milk supply system 100. The double tank milk supply system 100 includes the cabinet 102. Also shown on the right side of the cabinet 102 is a bottom view of the data input and display device 104 configured to accept a user's input data, and to display operational information.

On the back of the cabinet 102 are shown the chemical pump 502, the cold water connector 506, the pressurized air connector 508, and the electrical power connector 602.

On the bottom of the cabinet 102 are shown the components of the valve system 206 (shown in FIG. 2), including: the first wash valve 208, the first milk valve 210, the second wash valve 212, and the second milk valve 214. Also shown are the first level sensor 220, the second level sensor 222, and the U-shaped milk pipe 216.

This bottom view also includes the set of outgoing washing pipes 114, the first exit pipe 116, the second exit pipe 118, the wash hook hand valve 120, the drain valve 230, the wash pump 110 which pumps out the hot cleaning solution, and the drain pipe 112 configured to dispose of the washing fluids.

Other modifications and implementations will occur to those skilled in the art without departing from the spirit and the scope of the invention as claimed. Accordingly, the above description is not intended to limit the invention, except as indicated in the following claims.

What is claimed is:

1. A double tank milk supply system, for providing a continuous supply of milk or a milk product, the double tank milk supply system comprising:
    a pair of tanks, the pair of tanks having a first tank and a second tank, each tank configured to hold a sequence of fluids including: a milk product, a hot cleaning solution, and a cold water wash;
    a valve system, configured to independently control each of: the sequence of fluids exiting the first tank, and the sequence of fluids exiting the second tank;
    an automatic empty system, which automatically configures the valve system to dispense the milk product from the second tank when the first tank is empty, and to dispense the milk product from the first tank when the second tank is empty, thereby providing continuous dispensing of the milk product;
    a cooling system, which independently and alternately cools the first tank and then the second tank;
    an automatic washing system, which automatically washes the first tank when the first tank is empty, and which automatically washes the second tank when the second tank is empty;
    an agitation system, which independently agitates the milk product in the first tank, and independently agitates the milk product in the second tank;
    a wash pump to pump out the hot cleaning solution from a set of outgoing washing pipes;
    a tank insulation layer, configured to provide thermal insulation for the first tank and for the second tank;
    a data input and display device configured to accept a user's input data, and to display operational information; and
    a cabinet, which encloses at least the pair of tanks.

2. The double tank milk supply system of claim 1, wherein the pair of tanks are independently and alternately chilled to 40 degrees F. whenever the milk product is in each of the tanks.

3. The double tank milk supply system of claim 1, wherein the automatic washing system has a chemical pump, a wash pump, and a wash drain.

4. The double tank milk supply system of claim 1, wherein the valve system has valves that control the fluids exiting the pair of tanks, including:
    a first milk valve connected to a first exit pipe of the first tank;
    a first wash valve connected to the first exit pipe of the first tank;
    a second milk valve connected to a second exit pipe of the second tank;
    a second wash valve connected to the second exit pipe of the second tank;
    the first milk valve, the first wash valve, the second milk valve, and the second wash valve being configured such that:
    when the first milk valve is open to allow a flow of milk product, the first wash valve is closed to isolate the set of outgoing washing pipes, and
    when the second milk valve is open to allow a flow of milk product, the second wash valve is closed to isolate the set of outgoing washing pipes.

5. The double tank milk supply system of claim 1, wherein the automatic washing system has a wash valve manifold to control a transfer of a sequence of cleaning fluids, that includes:
    a first wash fill solenoid valve connected to the first tank;
    a first wash pump solenoid valve connected to the first tank;
    a second wash fill solenoid valve connected to the second tank;
    a second wash pump solenoid valve connected to the second tank;
    a central block, connecting the first wash fill solenoid valve and the first wash pump solenoid valve to the first tank, and connecting the second wash fill solenoid valve and the second wash pump solenoid valve to the second tank,
    configured such that when the first wash fill solenoid valve is open to inject the sequence of cleaning fluids, the second wash fill solenoid valve is closed to isolate the milk product in the second tank, and when the first wash pump solenoid valve is open to pump out the sequence of cleaning fluids, the second wash pump solenoid valve is closed to isolate the milk product in the second tank.

6. The double tank milk supply system of claim 1, wherein the pair of tanks is made of stainless steel, or fiberglass, or plastic, or aluminum.

7. The double tank milk supply system of claim 1, wherein the cabinet is made of stainless steel, or fiberglass, or plastic, or aluminum.

8. The double tank milk supply system of claim 1, wherein the data display and input device is a touch screen display, which responds to a touch of a user, and displays operational information about the double tank milk feeder system.

9. The double tank milk supply system of claim 1, wherein the valve system includes pneumatic valves.

10. A double tank milk supply system, for providing a continuous supply of milk or a milk product, the double tank milk supply system comprising:
    a pair of tanks, the pair of tanks having a first tank and a second tank, each tank configured to hold a sequence of fluids including: a milk product, a hot cleaning solution, a cold water wash, and pressurized air;
    a valve system, configured to independently control each of: the sequence of fluids exiting the first tank, and the sequence of fluids exiting the second tank, the valves that control the fluids exiting the pair of tanks including:
    a first milk valve connected to a first exit pipe of the first tank;
    a first wash valve connected to the first exit pipe of the first tank;
    a second milk valve connected to a second exit pipe of the second tank; and
    a second wash valve connected to the second exit pipe of the second tank,
    the first milk valve, the first wash valve, the second milk valve, and the second wash valve being configured such that:
    when the first milk valve is open to allow a flow of milk product, the first wash valve is closed to isolate the set of outgoing washing pipes, and when the second milk valve is open to allow a flow of milk product, the second wash valve is closed to isolate the set of outgoing washing pipes;

an automatic empty system, which automatically configures the valve system to dispense the milk product from the second tank when the first tank is empty, and to dispense the milk product from the first tank when the second tank is empty, thereby providing continuous dispensing of the milk product;

a cooling system, which independently and alternately cools the first tank and then the second tank;

an automatic washing system, which automatically washes the first tank when the first tank is empty, and which automatically washes the second tank when the second tank is empty;

an agitation system, which independently agitates the milk product in the first tank, and independently agitates the milk product in the second tank;

a wash pump to pump out the hot cleaning solution from a set of outgoing washing pipes;

a tank insulation layer, which provides thermal insulation for the first tank and for the second tank;

a data input and display device configured to accept a user's input data, and to display operational information; and a cabinet, which encloses at least the pair of tanks.

11. The double tank milk supply system of claim 10, wherein the pair of tanks are independently and alternately chilled to 40 degrees F. whenever the milk product is in each of the tanks.

12. The double tank milk supply system of claim 10, wherein the automatic washing system has a chemical pump, a wash pump, and a wash drain.

13. The double tank milk supply system of claim 10, wherein the automatic washing system has a wash valve manifold to control a transfer of a sequence of cleaning fluids, that includes:

a first wash fill solenoid valve connected to the first tank;

a first wash pump solenoid valve connected to the first tank;

a second wash fill solenoid valve connected to the second tank;

a second wash pump solenoid valve connected to the second tank;

a central block, connecting the first wash fill solenoid valve and the first wash pump solenoid valve to the first tank, and connecting the second wash fill solenoid valve and the second wash pump solenoid valve to the second tank, configured such that when the first wash fill solenoid valve is open to inject the sequence of cleaning fluids, the second wash fill solenoid valve is closed to isolate the milk product in the second tank, and when the first wash pump solenoid valve is open to pump out the sequence of cleaning fluids, the second wash pump solenoid valve is closed to isolate the milk product in the second tank.

14. The double tank milk supply system of claim 10, wherein the pair of tanks is made of stainless steel, or fiberglass, or plastic, or aluminum.

15. The double tank milk supply system of claim 10, wherein the cabinet is made of stainless steel, or fiberglass, or plastic, or aluminum.

16. The double tank milk supply system of claim 10, wherein the data display and input device is a touch screen display, which responds to a touch of a user, and displays operational information about the double tank milk feeder system.

17. The double tank milk supply system of claim 10, wherein the valve system includes pneumatic valves.

* * * * *